UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

SEASONING MATERIAL AND PROCESS OF MAKING SAME.

1,002,506.  Specification of Letters Patent.  Patented Sept. 5, 1911.

No Drawing.   Application filed April 8, 1911.  Serial No. 619,706.

*To all whom it may concern:*

Be it known that I, CARLETON ELLIS, a citizen of the United States, and a resident of Montclair, in the county of Essex and State of New Jersey, have invented certain new and useful Improvements in Seasoning Material and Processes of Making Same, of which the following is a specification.

This invention relates to a composition of matter intended as a seasoning and flavoring material and relates in particular to a composition comprising ordinary salt and the essential oils and principles of onions (genus *Allium*).

It has been heretofore suggested that onions be used as a seasoning and flavoring material, by mixing it with more or less salt and drying out the material to make flakes of the onion material more or less coated with salt.

The present invention has to do more particularly with a saline composition in a dry pulverulent form, largely or entirely free from onion fiber, but treated so as to obtain a powerful seasoning and flavoring composition, which retains its flavoring and characteristic odor for a long period of time.

If onion is dried in the presence of salt in an ordinary drying oven under atmospheric pressure, a product is produced which is rather dark in appearance as a rule and therefore rather unsightly. This material is also likely to undergo decomposition through oxidation, etc., so that after a time, on exposure, the characteristic odor of onion is lost. Even in drying, changes take place which bring about undesirable modifications in the odor of the product. This is apparently partly due to the presence of a large amount of fiber, which acts as an absorbent material to hold the onion juices imprisoned and away from the preservative action of the salt. Merely mixing up onion leaves or choppings with salt and allowing the same to dry under atmospheric pressure in an ordinary drying oven for example, does not give the proper contact with salt of all the onion juices, as osmotic action is too feeble to secure a complete diffusion and intermingling of the salt and juices within the fibers.

The present invention has to do more particularly with the combination of onion juices substantially freed from fiber, with the requisite amount of salt, and the drying of this material, preferably under reduced atmospheric pressure. By the partial, or complete removal of the fibers, an improved diffusion of the saline matter occurs, or in case of the entire absence of fiber, a perfect intermingling of the onion juices and the salt comes about, resulting in a product which preserves its characteristic odor and flavor for an indefinite time.

In carrying out the invention, I preferably comminute fresh onion into small particles and place this comminuted mass in a powerful press, thereby expressing substantially all the juices of the onion. This juice is then combined with salt to make a paste and evaporated in a vacuum pan, preferably under very high vacuum, until the water has been substantially removed. The product is then readily ground, when it may be mixed with starch, or any other filling material which tends to maintain salt in a dry, readily flowable state. Carbonate of lime, in particular, tends to preserve the neutrality of the composition when exposed under severe service conditions.

A suitable proportion of the material for making onion salt is 2¼ lbs. of chopped onions, and 6½ lbs. of salt. The juice of the onions is first expressed, as above described, combined with the salt and when thoroughly incorporated, placed in a vacuum pan, drying until freely pulverulent and easily ground. This mixture is preferably combined with one pound of calcium carbonate or one and one-half pounds of starch. By drying *in vacuo* the characteristic odor and flavor of the onion is preserved and while I do not wish ordinarily to introduce fiber into the material and therefore preferably employ the clear juices of the onion in mixing the present composition, I might state that it is possible to employ the vacuum pan to remove the moisture from the comminuted material which has been combined with salt and subjected to vacuum drying and to subsequently remove the fiber if desired. After being dried in the presence of salt, the fiber is particularly hard to grind and is usually badly discolored, and for this and other reasons, is usually considered objectionable, and I therefore, when operating under such conditions, after having dried the salt, onion juices and fiber together in the vacuum pan, subject them to a preliminary grinding and am then able to bolt or treat by air flotation or otherwise to remove the fiber, or a substantial part of it, thereby giving an improved product much more satisfying in appearance and odor than when the entire amount of fiber remains.

To recapitulate, my invention consists, broadly speaking, in the combination of the onion material with salt, the onion material being preferably in a comminuted condition, and the salt preferably being in a finely divided state and in drying the product under a reduced or greatly reduced atmospheric pressure and at a relatively low temperature, and consists more particularly in drying the expressed juices of the onion in combination with salt so as to form a substantially fiber free composition, having a strong characteristic odor of fresh onions and exhibiting usually a light green color; the composition being rendered more flowable by the addition of a non-hygroscopic extending material, such as starch and the like. Carbonate of lime may serve as antacid material.

The seasoning material, in its preferred form, is particularly characterized by the presence of the onion material solely in a substantially unoxidized or undecomposed state in admixture with an excess of salt and devoid of chemical combination with the latter.

Having described my invention, as to the details of which I do not wish to be limited, what I claim is—

1. A composition of matter adapted for use as a seasoning material, comprising substantially unoxidized vacuum dried onion-juices in combination with an excess of common salt; said composition being in a dry pulverulent form.

2. A composition of matter adapted for use as a seasoning material, comprising substantially unoxidized vacuum dried onion-juices intimately associated with an excess of common salt; said composition being in a dry pulverulent form.

3. A composition of matter adapted for use as a seasoning material, comprising substantially unoxidized vacuum-dried onion-juice intimately incorporated with common salt, said composition being in a dry pulverulent form.

4. A composition of matter adapted for use as a seasoning material, comprising substantially unoxidized and undecomposed vacuum-dried onion-juice intimately incorporated with an excess of common salt but devoid of chemical combination therewith, said composition being in a dry pulverulent form and having the odor substantially of raw fresh onion.

5. A composition of matter adapted for use as a seasoning material, comprising a pulverulent product containing vacuum dried onion juices intimately associated with common salt and a non-hygroscopic extending material.

6. A composition of matter adapted for use as a seasoning material, consisting of vacuum dried onion juices intimately associated with common salt and non-hygroscopic extending material, said composition being in a dry pulverulent form and having a yellowish green color.

7. The process of making a seasoning material which consists in comminuting fresh onions, subjecting to pressure to remove the juices thereof, combining said juices with salt drying the product under reduced atmospheric pressure, mixing the dried material with non-hygroscopic extending material, and grinding to a fine powder.

8. The process of making a seasoning material which consists in comminuting onions, subjecting to pressure to remove the juices thereof, combining said juices with an excess of salt, drying the product under reduced atmospheric pressure, mixing the dried material with non-hygroscopic extending material and grinding to a fine powder.

9. The process of making a seasoning material which comprises subjecting onions to pressure to remove the juices thereof, combining said juices with salt, drying the product under reduced atmospheric pressure and grinding to a fine powder.

Signed at Montclair in the county of Essex and State of New Jersey this 14th day of February A. D. 1911.

CARLETON ELLIS.

Witnesses:
S. M. SPEDON,
B. M. ELLIS.